(12) United States Patent
Miller et al.

(10) Patent No.: US 7,931,089 B2
(45) Date of Patent: Apr. 26, 2011

(54) PROPPANT AND METHODS OF USE

(75) Inventors: Matthew J. Miller, Cambridge (GB); Dean M. Willberg, Tucson, AZ (US); Anatoly Vladimirovich Medvedev, Moscow (RU); Marina Nikolaevna Bulova, Edmonton (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 68 days.

(21) Appl. No.: 12/095,184

(22) PCT Filed: Dec. 20, 2006

(86) PCT No.: PCT/US2006/062380
§ 371 (c)(1),
(2), (4) Date: Sep. 25, 2008

(87) PCT Pub. No.: WO2007/076389
PCT Pub. Date: Jul. 5, 2007

(65) Prior Publication Data
US 2009/0014176 A1    Jan. 15, 2009

(30) Foreign Application Priority Data
Dec. 23, 2005 (RU) ................... 2005140358

(51) Int. Cl.
*E21B 43/267* (2006.01)
*C09K 8/62* (2006.01)
*C09K 8/80* (2006.01)

(52) U.S. Cl. .................. 166/308.3; 166/280.2; 428/375; 428/407; 507/269

(58) Field of Classification Search .................. None
See application file for complete search history.

(56) References Cited

U.S. PATENT DOCUMENTS

| | | | |
|---|---|---|---|
| 4,547,468 A | 10/1985 | Jones et al. | |
| 4,923,714 A | 5/1990 | Gibb et al. | |
| 6,330,916 B1 * | 12/2001 | Rickards et al. | 166/280.2 |
| 6,528,157 B1 | 3/2003 | Hussain et al. | |
| 6,632,527 B1 | 10/2003 | McDaniel et al. | |
| 2006/0258546 A1 * | 11/2006 | Brannon et al. | 507/269 |

* cited by examiner

*Primary Examiner* — Zakiya W. Bates
(74) *Attorney, Agent, or Firm* — David Cate; Robin Nava; Jeff Griffin

(57) ABSTRACT

A proppant consists of a core part and shell of a material different from the material of the core part. The shell comprises a soft material attached rigidly to the core part in such a way that the total surface area of the points where the shell and the core part are joined is less than the surface area of the core part.

21 Claims, 2 Drawing Sheets

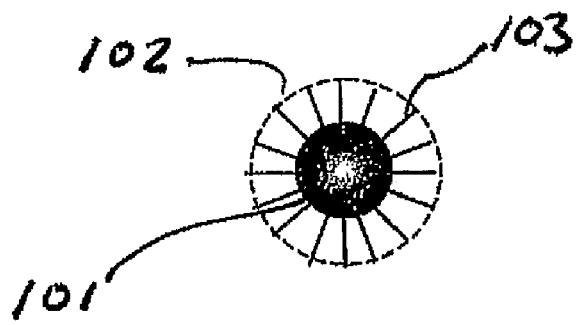
Fig. 1a
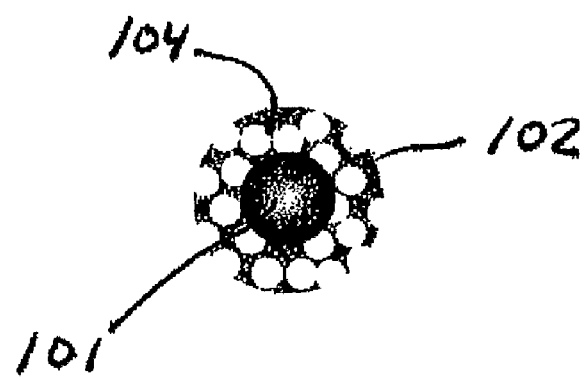
Fig. 1b
Fig. 1

Fig.2a
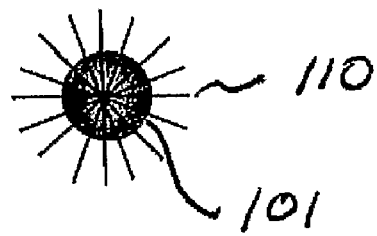
Fig.2b
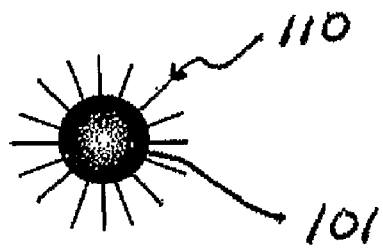
Fig.2c
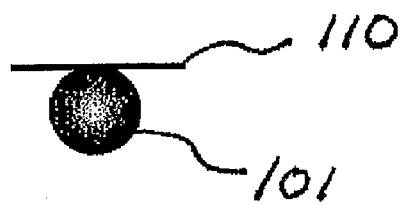
Figure 2

PROPPANT AND METHODS OF USE

BACKGROUND OF THE INVENTION

1. Field of the Invention

The present invention relates to the oil and gas sector and in particular to a proppant for use in methods of stimulating oil or gas reservoirs by hydraulic fracturing.

2. Description of the Prior Art

The principle of hydraulic fracturing is to create fractures in a reservoir in the wellbore region to increase permeability near the wellbore and improve oil production. Specific fluids properties and pumping pressure properties are used to create these fractures. However, once pumping ends, the pressure reduces, or the fluid used for hydraulic fracturing flows back or is removed, the walls of these fractures tend to close due to reservoir pressure. To prevent this closure, it is common to add a granular material referred to as proppant to the fracturing fluid. The proppant is delivered into the fracture along with the fracturing fluid. It is desirable that the proppant remain in the fracture to mechanically prevent closure of the reservoir after pressure is reduced. The proppant therefore has to have a specific set of properties, such as suitable strength, to withstand prolonged loading, and porosity, and must be of a particular size. It must be strong enough to resist reservoir pressure and light enough to be delivered into the fracture before it settles. Thus, while most materials possess high durability and high density, the optimal proppant should possess high strength and low density.

At present a thrust in the development of proppant technology and chemical composition is focused on lowering the density of the proppant and certain trends can be identified in the development of new materials which combine high strength and low density. One area is development of low-density materials for the manufacture of proppant: For example, one proposal is to use polymeric granules, in particular, granules based on polystyrene divinylbenzene. Low-density bauxites with high durability properties have also been developed. Another area is use of composite materials. One proposal described in U.S. Pat. No. 4,923,714 is the use of ceramic proppants with a coating made of a thin polymeric film that prevents the penetration of fluids into the proppant, reducing the effective density of the proppant. Another as described in U.S. Pat. No. 6,632,527 makes use of a composite material based on a mixture of ceramic particles and polymer resin. A further proposal described in U.S. Pat. No. 6,528,157 relates to particles with a coating fabricated from resin and fibrous material. A hollow proppant is described in U.S. Pat. No. 4,547,468. All of the preceding references are hereby incorporated by reference.

A method is known of delivering proppant into a fracture based on a reduction in the settling rate. The effect is achieved in several ways. One method is by increasing the viscosity and density of the fluid used for hydraulic fracturing. However particular fluid densities and viscosities are required to be useful as a fracturing fluid. Any large change in these properties is therefore difficult to achieve. Another method is by reducing the density of the proppant. In the majority of cases however reduction in the density of the proppant leads to a decrease in its strength. The use of special materials often leads to significant cost increases. Another method is by introducing special additives into the fluid used for hydraulic fracture, for example polymeric fibers, to reduce the proppant settlement rate by mechanically restricting settlement of the proppant.

Use of these described methods however generally leads to cost increases. The benefits of achieving the optimum relationship of high strength and low density for the proppant may not compensate or offset for the additional expenses and the complexities of production. An aim of the present invention is the creation of a proppant having desirable physical properties that provide improvements in economy and effectiveness in use.

SUMMARY OF THE PRESENT INVENTION

Described generally, the present invention provides a proppant that combines the requisite strength to prevent closure of the reservoir and the appropriate buoyancy to prevent premature settlement of the proppant as it is delivered into the fracture.

An embodiment of the present invention provides a proppant consisting of a core part and a shell of a material different from the material of the core part, wherein the shell is fabricated of a soft material and is attached to the core part in such a way that the total surface area of the points where the shell and the core part are joined is less than the surface area of the core part. Thus, the combined surface areas of the points where the shell and the core part are joined should be less than the total surface area of the core part. The shell may be formed of a material which is relatively soft compared to the material of the core part.

The material of the shell may be soluble or non-soluble (for example, in water or in oil).

In some embodiments the shell is made of fibers, and more specifically polymeric fibers. One or more of the fibers can each have more than one point of bonding with the core part. The fibers may extend radially a distance which is equal to or greater than the radius of the core part. Two or more polymeric fibers joined at adjacent points on the surface of the core part may extend in diverging directions from the core part. Alternatively, two or more polymeric fibers joined at adjacent points on the surface of the core part may extend in substantially parallel directions from the core part. Different fractions of the polymeric fibers may have different rates of solubility. For example, a fraction of the polymeric fibers may be soluble, and another fraction may be non-soluble. Preferably, the polymeric fibers have a triangular cross-section. In other embodiments the shell is made of a spongy material.

Another embodiment of the present invention provides a proppant consisting of a core (i.e. main) part and a part attached to it made of a material different from the material of the core part, wherein the attached part is in the form of a disk. The disk may be made of a polymeric material. Typically, the main part is substantially spherical, i.e. has an aspect ratio of about 1. The core part is preferably attached to a central portion of the disk.

Another embodiment of the present invention provides a proppant consisting of a plurality of granules coated with a shell of a material different from the material of the granules, wherein the shell is made of a first polymeric material and the granules are bonded together by a second polymeric material which can be the same as or different to the first polymeric material. The first or the second polymer or both may be degradable (e.g. soluble in water and/or in oil) or non-degradable. The granules may be bonded together in such a way as to allow neighboring granules to move flexibly relative to each other. In some embodiments, said plurality of granules consists of more than two granules, and the granules are bonded together into a chain. In other embodiments, said plurality of granules consists of more than three granules, and the granules are bonded together into a lattice.

BRIEF DESCRIPTION OF THE DRAWINGS

Embodiments of the present invention will now be described with reference to the accompanying drawings, in which:

FIG. 1 is a schematic representation of various embodiments of proppants according to the present invention, and FIG. 2 is a schematic representation of a particle which has a disk "parachute".

DETAILED DESCRIPTION AND PREFERRED EMBODIMENTS

Embodiments of the present invention comprise a proppant having a combination of a main or core part and a shell part, wherein the shell part is connected or linked to the core part. When moving in a fluid, such as during pumping of a fracturing fluid, the proppant of the present invention reduces the settling rate of the proppant by mechanical interaction, lowering the effective density of the proppant without reducing its strength, or generating a parachute effect.

An example of an embodiment of the present invention is demonstrated by a proppant having a combination of a main or core part and a shell part comprising polymeric fibers, wherein the fibers are connected or linked to the core part. When moving in a fluid, such as during pumping of a fracturing fluid, the proppant of the present invention reduces the settling rate of the proppant by mechanical interaction, lowering the effective density of the proppant without reducing its strength.

Advantages of the present invention are apparent when explained reference to theoretical considerations. Stokes law is generally applied when calculating the settling rate of particles in fluid and is used here for a rough calculation of the anticipated effect. For spherical particles Stokes law can be expressed as:

$$\vartheta = 2/9 \cdot \frac{r^2(\rho_{pr} - \rho_{liq})}{\eta} g \qquad (1)$$

where $\vartheta$ is the settling rate of the particles, r is the particle radius, $\rho_{pr}$ is the particle density, $\rho_{liq}$ is the density of the fluid, $\eta$ is the viscosity of the fluid and g is the acceleration of gravity. As can be seen from the formula, the viscosity of the fluid can be increased to decrease settling rate. But, given the techniques of hydraulic fracturing, fluid viscosity is generally dictated by reservoir characteristics. So it is only the density of the proppant ($\rho_{pr}$) that can be realistically varied in Equation 1.

One approach to changing the effective density of the proppant is to coat it with a material which is light compared to the proppant itself. An example is a polymer material. While this method is technically effective, using even the cheapest polymer generally triples or quadruples proppant costs, making this approach impractical.

A more efficient approach used by the present invention is to decrease the settling rate of the proppant by reducing its effective density or increasing the effective size of the particles.

An embodiment of the present invention comprises proppant comprising a main or core part and a second part comprising a non-continuous soft shell. The soft shell may include, for example, a polymer fiber, a polymer sponge or other material. Referring to FIG. 1, some embodiments of the present invention are schematically representation of how such proppants can be formed. Shown in FIG. 1a, core part 101 is contained within shell 102, wherein shell 102 comprises multiple fibers 103. Shown in FIG. 1b, core part 101 is contained within a shell 102 shown as spongy material 104

When the proppant is placed in a fluid flow, such as pumped fracturing fluid, the surrounding fluid is entrained or absorbed by the non-continuous soft shell such as fibers or sponge. This leads to an increase in the effective size of the particles (indicated here by a dotted line) and so to a reduction in the effective density of the particles. A calculation using Stokes law (Eq. 1) shows that to halve the proppant settlement rate, the fiber size or the thickness of the non-continuous shell should be equal to the particle radius.

In this way, the settlement rate can be adjusted by increasing or decreasing the length of the polymer fibers or the number of fibers per unit of proppant surface area. Increasing the length of the polymer fibers leads to an effective reduction in the proppant settlement rate. Using Stokes law (Eq. 1), it can be demonstrated that the ratio of the proppant settlement rate before and after modification is equal to the ratio of effective proppant radii R after and before modification and does not in fact depend on the density of the fluid and proppant as per the following relationship:

$$\frac{\vartheta_{before}}{\vartheta_{after}} = \frac{R_{after}}{R_{after}} \qquad (2)$$

It is also possible to adjust the settlement rate by varying the quantity of polymer fibers per unit of proppant surface. Increasing the number of fibers per unit of surface initially leads to a reduction in the proppant settlement rate, with further increases leading to a minimum value for the settlement rate. Any increase thereafter in the quantity of fibers per unit of surface is accompanied by an increase in the settlement rate as compared with the minimum value. Yet, even with higher quantities of fibers per square unit, the settlement rate of the proppant is still less than the settlement rate of the unmodified proppant.

It should be noted that any adjustment in the proppant settlement rate will also be linked to the cross-section, density and thickness of the polymer fiber. The cross-sectional shape of the fibers is may be any shape, such as round. Preferably the cross-sectional shape is triangular; this follows from the hydrodynamic parameter for frontal resistance of bodies of different shape.

Samples of proppants according to various embodiments of the present invention were prepared. The settlement rates of these samples in a polymer fracturing fluid at room temperature were tested. The settlement rate of ordinary proppant also was tested under the same conditions. Testing results indicated that proppant prepared according to the present invention settled three times more slowly from the fracturing fluid than the ordinary proppant.

In the fabrication of the fiber it is preferable to use polymers with minimum density. While polymer density of the fiber does not have any great effect on proppant settlement rate if the proppant has a relatively small volume of polymer fibers, the role played by polymer density in calculations for effective density when there are large volumes of fibers is significant.

The use of water-soluble polymer fibers which dissolve in reservoir conditions also offers additional advantages. By using fibers of different settlement rates or using non-soluble polymer fibers, the density of the polymer packing in a fracture can be adjusted to offer more economic expenditure.

Proppants based on non-soluble polymer fibers are useful for fractures with low reservoir closure pressures. This leads to non-compact packing of the fracture by the proppant and offers an increase in fracture permeability.

Another embodiment of the present invention comprises a proppant configured to employ the 'parachute' effect. In its general form Stokes law is expressed as $$\vartheta = \frac{V(\rho_{pr} - \rho_{liq})}{6r\eta\pi} g \quad (3)$$

where $\vartheta$ is the settling rate of the particles, r is the particle radius, V is the particle volume, $\rho_{pr}$ is the particle density, $\rho_{liq}$ is the density of the fluid, $\eta$ is the viscosity of the fluid, g is the acceleration of gravity, and $\pi$=3.14.

It can be seen that, given constant density, volume and viscosity of the particles, the particle radius has to be increased to achieve a reduction in the settlement rate. A way to increase the particle radius is to modify the core part by adding with a small quantity of additional material, such as a disc, configured in a manner to similar to a 'parachute' attached to the particle. An example of this type of particle is shown in FIG. 2. FIG. 2a shows a top view of parachute 110 in relation to core part 101. FIG. 2b shows a bottom view of core part 101 and parachute 110, while FIG. 2c shows a side view. In some embodiments of the present invention, the shell comprises a disk. The disks may be a different material and is preferably polymeric.

Another embodiment of the present invention comprises a proppant configured from more than two particles. For example, chains made of individual particles may be produced, such as beads or a lattice. The particles or granules are coated with a polymeric material and bonded in chains with the same or another type of polymeric material. The distance between the granules may be of various lengths but is preferably sufficient for the chain to be of a required flexibility. The length of the chains or the dimensions of the bead may also vary in size (from several millimetres to several centimetres) depending on the operating capacity of the surface equipment (for example, a Schlumberger POD™ blender) and the perforation size in the well. During the preparation of the fracturing fluid the chains and beads will interlace, forming a likeness of a complex lattice in a gel. These lattices can be created by bonding in a purposeful way. The proppant particles will adhere to the lattice and the proppant loss will be minimised.

Various kinds of polymers, both degradable and non-degradable, can be used in the production of such chains. The particles must be coated in such a way that they are joined one to another by 'threads' made of the polymer.

To avoid any limitation in chain length due to the operating capacity of the surface equipment or to the perforation diameter, processes occurring directly within the fracture during which the proppant grains will cluster into chains or other aggregations can provide an alternative method of obtaining proppant chains or lattices. Very different forces—chemical (for example, slow release of the polymer which binds the proppant grains), physical (for example, magnetic or other interaction) or mechanical—may be employed in these self-aggregation processes.

The present invention provides various embodiments for the configuration of proppants and use thereof. The embodiments can offer a combination of high strength and low density to prevent premature settlement of a proppant during its delivery to a fracture and prevent closure of the fracture under reservoir pressure. Loss of proppant after closure of the fracture can also be minimized.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A proppant comprising a core part and shell, wherein the shell is attached to the core part in such a way that the total surface area of the points where the shell and the core part are joined is less than the surface area of the core part and the shell is a softer material than the material of the core part.

2. The proppant as claimed in claim 1, wherein the shell comprises of polymeric fibers.

3. The proppant as claimed in claim 2, wherein one or more of the polymeric fibers are bonded at more than one point with the core part.

4. The proppant as claimed in claim 2, wherein the length of the fibers from the point of attachment with the core part is equal to or greater than the radius of the core part.

5. The proppant as claimed in claim 2, wherein at least some of the polymeric fibers are made of a soluble material.

6. The proppant as claimed in claim 2, wherein the shell comprises polymeric fibers having different solubility.

7. The proppant as claimed in claim 2, wherein the shell comprises polymeric fibers having a triangular cross-section.

8. The proppant as claimed in claim 1, wherein the shell comprises a spongy material.

9. The proppant as claimed in claim 8, wherein the spongy material is polymeric.

10. The proppant as claimed in claim 1 wherein the shell comprises a disk.

11. The proppant as claimed in claim 10, wherein the disk comprises a polymeric material.

12. A fracturing fluid comprising the proppant of claim 1.

13. A proppant comprising two or more granules coated with a shell of a material different from the material of the granules, wherein the shell comprises a polymeric material and the granules are bonded by a polymeric material, and wherein at least one of the polymeric materials is degradable.

14. The proppant of claim 13 wherein the polymeric material that bonds the granules is the same as the polymeric material of the shell.

15. A fracturing fluid comprising the proppant of claim 13.

16. A method of fracturing a reservoir intersected by a wellbore comprising injecting a fracturing fluid comprising a proppant into the wellbore to fracture the reservoir, wherein the proppant comprises a core part and shell, wherein the shell is attached to the core part in such a way that the total surface area of the points where the shell and the core part are joined is less than the surface area of the core part and the shell is a softer material than the material of the core part.

17. The method of fracturing claimed in claim 16, wherein the shell comprises polymeric fibers.

18. The method of fracturing claimed in claim 16, wherein the shell comprises a spongy material.

19. The method of fracturing claimed in claim 16, wherein the shell comprises a disk.

20. A method of fracturing a reservoir intersected by a wellbore comprising injecting a fracturing fluid comprising a proppant into the wellbore to fracture the reservoir, wherein the proppant comprises two or more granules coated with a shell of a material different from the material of the granules, wherein the shell comprises a polymeric material and the granules are bonded by a polymeric material, and wherein at least one of the polymeric materials is degradable.

21. A method of adjusting the settlement rate of a proppant comprising providing a proppant comprising a core part and shell comprising polymeric fibers, wherein the fibers are attached to the core part in such a way that the total surface area of the points where the fibers are attached to the core part is less than the surface area of the core part; and increasing or decreasing the length of the fibers or increasing or decreasing the number of fibers per unit of surface area of the core part.

* * * * *